(12) United States Patent
Tölzer et al.

(10) Patent No.: US 7,347,084 B2
(45) Date of Patent: Mar. 25, 2008

(54) ROUGHNESS MEASURING INSTRUMENT WITH TESTING STANDARD

(75) Inventors: Jürgen Tölzer, Frauenberg (DE); Reinhard Willig, Geisenfeld/Ilmendorf (DE)

(73) Assignee: Carl Mahr Holding GmbH, Göttingen (DE)

(*) Notice: Subject to any disclaimer, the term of this patent is extended or adjusted under 35 U.S.C. 154(b) by 93 days.

(21) Appl. No.: 10/565,882

(22) PCT Filed: Jul. 12, 2004

(86) PCT No.: PCT/EP2004/007653

§ 371 (c)(1),
(2), (4) Date: Jan. 25, 2006

(87) PCT Pub. No.: WO2005/010457

PCT Pub. Date: Feb. 3, 2005

(65) Prior Publication Data

US 2007/0068232 A1    Mar. 29, 2007

(30) Foreign Application Priority Data

Jul. 26, 2003   (DE) .............................. 103 34 219

(51) Int. Cl.
*G01N 19/02* (2006.01)
*G01B 5/28* (2006.01)

(52) U.S. Cl. .......................... 73/104; 73/105

(58) Field of Classification Search ............... 73/105, 73/1.89, 104; 33/546
See application file for complete search history.

(56) References Cited

U.S. PATENT DOCUMENTS

| 3,501,841 | A |   | 3/1970 | Adams .................. 33/546 |
| 3,505,861 | A |   | 4/1970 | Schoefer et al. ......... 73/105 |
| 4,928,517 | A | * | 5/1990 | Fitts ................... 73/105 |
| 5,955,661 | A | * | 9/1999 | Samsavar et al. ........ 73/105 |
| 6,594,532 | B2 |  | 7/2003 | Mills .................. 700/56 |

FOREIGN PATENT DOCUMENTS

DE    41 32 724 C2    9/1995
DE    198 17 406 C    2/2000

* cited by examiner

*Primary Examiner*—Hezron Williams
*Assistant Examiner*—Tamiko Bellamy
(74) *Attorney, Agent, or Firm*—Fitch, Even, Tabin & Flannery

(57) ABSTRACT

The roughness measuring instrument (1) has a receiving device (2) for a feeder device (3), which serves to drag a roughness sensor (4) over a workpiece surface. The receiving device (2) carries a testing standard (24) with a testing face (25) within range of the roughness sensor (4). Preferably, the testing standard (24) is located in a pocket affixed to the receiving device (2), and this pocket is embodied in the wall of a bore for receiving the feeder device (3). Its testing face (25) is thus located inside the receiving device (2) in a way that is protected against becoming soiled and damaged yet is readily accessible.

15 Claims, 5 Drawing Sheets

ROUGHNESS MEASURING INSTRUMENT WITH TESTING STANDARD

CROSS REFERENCE TO RELATED APPLICATION

This application is the National Stage filing under 35 U.S.C. 371 of International Application No. PCT/EP2004/007653, filed Jul. 12, 2004, and claims priority of German Patent Application 103 34 219.2, filed Jul. 26, 2003.

BACKGROUND OF THE INVENTION

The invention relates to a roughness measuring instrument.

Roughness measuring instruments are in use in the workshop and in business for determining characteristic roughness values of workpieces. For example, a roughness measuring instrument is known from German Patent DE 41 32 724 C2. It comprises a feeder device and a roughness sensor moved by the feeder device. The signals generated by the roughness sensor are delivered to an evaluation device, in order to determine characteristic roughness values.

The roughness sensor has a diamond tip, supported on a lever arm and guided in sliding fashion over the workpiece surface. The motions of the diamond tip caused by the surface roughness are detected by a suitable sensor and converted into electrical signals. The magnitude of the deflection of the diamond tip corresponds to the signal amplitude of the sensor device. From the electrical signals picked up, the characteristic roughness values are determined. Care must therefore be taken to assure that the electrical signals in their magnitude depend in a defined way on the roughness. To that end, the roughness measuring instrument is subjected to a calibration.

The calibration must be monitored from time to time to assure that the characteristic roughness values ascertained by the device are reliable. This should be done in as simple a way as possible.

With this as the point of departure, it is the object of the invention to create a reliable roughness measuring instrument.

SUMMARY OF THE INVENTION

The above object generally is attained with the roughness measuring instrument according to the invention, which in a simple way makes occasional checking of correct calibration possible. To that end, the roughness measuring instrument has a receiving device, which carries both the feeder device with its roughness sensor and a testing standard. The testing standard is preferably located at a point inside the receiving device such that on the one hand it can be reached by the roughness sensor and on the other it is protected against access from outside. The testing standard is formed for instance by a plastic element with a substantially flat surface, whose roughness is known or defined. The testing standard may for instance be obtained by molding a copy of an adjustment standard. In this respect it is less precise than an adjustment standard, but is precise enough to be able to check the roughness measuring instrument for whether a new calibration is necessary. The adjustment standard is immediately available if needed; a comparison measurement can be made at any time with only a few manipulations, and no additional measurement assembly is necessary.

The receiving device is preferably embodied as a flat block-shaped body, which has a receiving prism for a workpiece on one short side. This receiving prism is formed by two flat faces forming an obtuse angle with one another, which viewed from outside form a concave indentation. At the imaginary line of intersection of the two faces, there is preferably a slit, through which the roughness sensor has access to the surface of a workpiece placed on this prism.

A cylindrical bore is preferably embodied in the receiving device, parallel to this prism, and serves to receive the feeder device with the roughness sensor. The feeder device can be axially displaced in the receiving device, so that the roughness sensor can be positioned both outside the receiving device and inside it. Moreover, the feeder device can preferably be rotated about its longitudinal axis by hand with only little force. For this purpose, it preferably has a cylindrical housing. In this embodiment, the testing standard is located in a pocket embodied in the wall of the cylindrical recess. For instance, it is clamped, glued, or press-fitted into the pocket. It is thus kept from being lost and is protected, and checking the calibration of the roughness sensor can be done in the simplest possible way by rotating the feeder device 180° in the receiving device, so that the roughness sensor comes into contact with the surface of the testing standard. A simple scanning operation is then performed. If this operation furnishes the expected characteristic roughness values with the desired precision, the calibration of the roughness measuring instrument can be dispensed with.

Because the testing standard is located in the recess for the feeder device, using the roughness measuring instrument is especially easy. In particular, the calibration can be checked extremely simply and securely. If recalibration has to be performed, for instance to readjust the sensitivity of the roughness sensor or the amplification factor of an amplifier connected to it, this can be done if necessary at the testing standard. Preferably, however, a calibration standard is used, which is stored separately and used only as needed. It may be made of steel or glass.

Further advantageous details of embodiments of the invention are the subject of the dependent claims, the drawing, or the description.

BRIEF DESCRIPTION OF THE DRAWINGS

In the drawing, one exemplary embodiment of the invention is shown. Shown are.

DETAILED DESCRIPTION OF THE INVENTION

Figure 1:
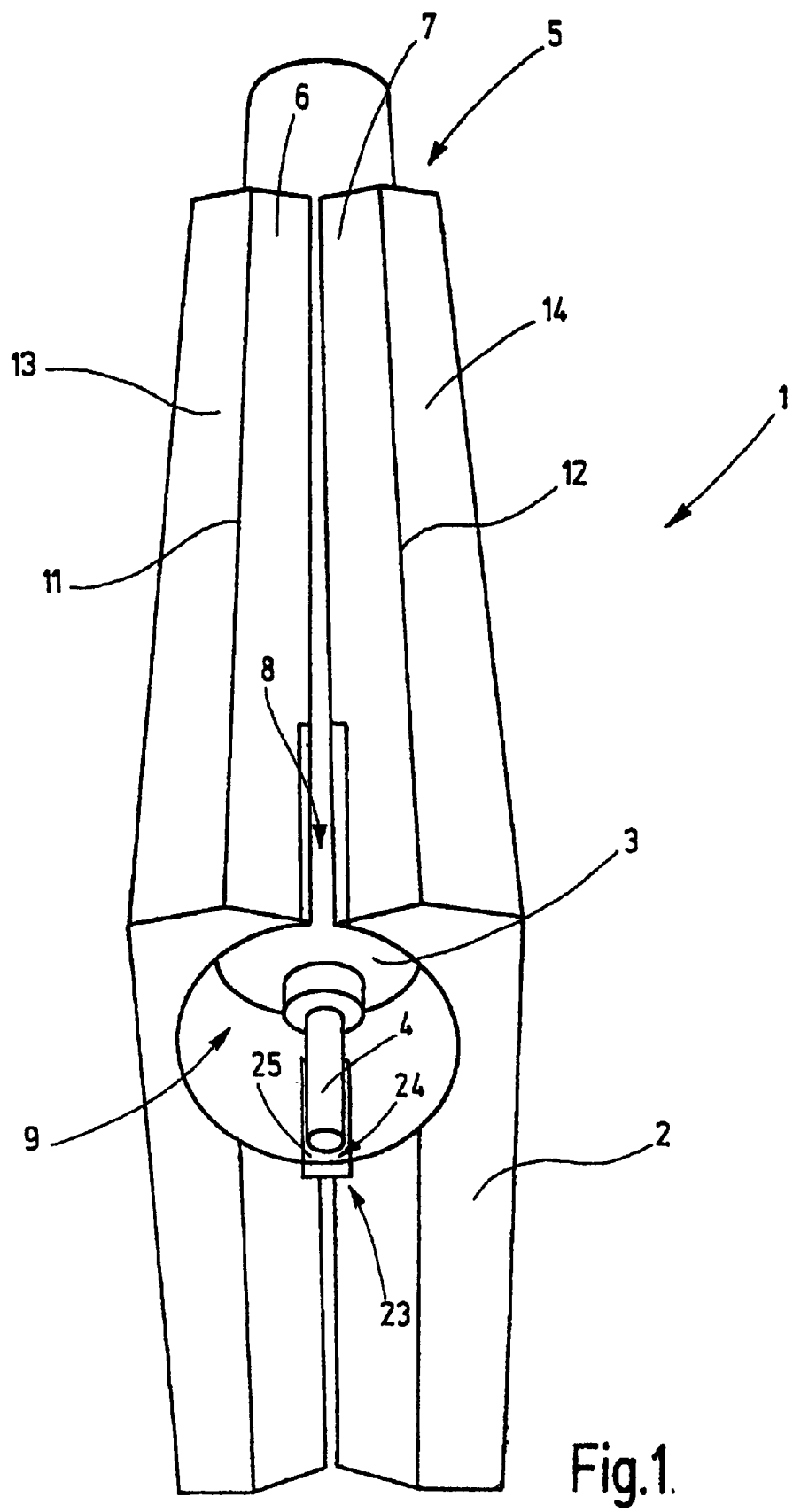
FIG. 1, a perspective view of the roughness measuring instrument of the invention while a calibration is being checked.

In FIG. 1, a roughness measuring instrument 1 is shown, which includes a receiving device 2 for a feeder device 3 with a roughness sensor 4. The receiving device 2 overall is approximately block-shaped. It may be formed by two parts joined together, or by one part, which on a short side 5 has a prism for receiving workpieces. This prism is formed by two flat faces 6, 7, which together form an obtuse angle. The faces 6, 7 between them define a slit 8, which leads into a cylindrical recess 9 that is parallel with it. This recess serves to receive the feeder device 3. The slit 8 penetrates its jacket.

The faces 6, 7 are adjoined, at respective edges 11, 12, by further faces 13, 14, forming a low gable shape. The edges 11, 12 serve for instance as edges for setting up the receiving device 2 on flat surfaces.

The recess 9 is preferably embodied as a through bore. Its diameter is slightly greater than the outer diameter of the cylindrical housing of the feeder device 3. This housing is thus retained axially displaceably and rotatably about its longitudinal axis in the recess 9. The feeder device is seated with little play (sliding fit) in the recess 9. The friction between the housing, for instance of plastic, of the feeder device and the wall of the recess 9 secures the feeder device in its place.

Figure 2:
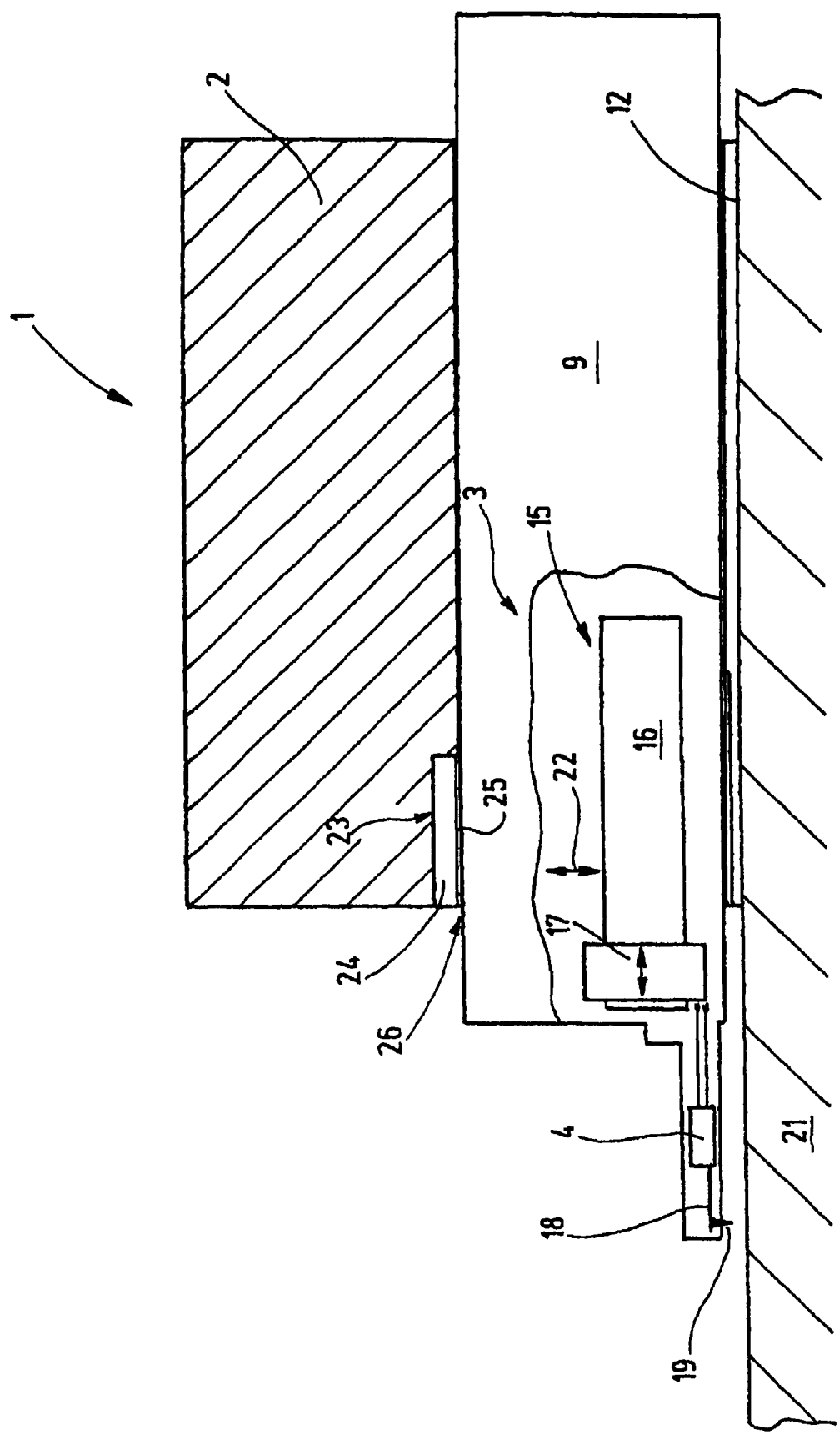
FIG. 2, in longitudinal section, the roughness measuring instrument in measuring the roughness of a workpiece surface.

As FIG. 2 shows, the feeder device 3 includes a guide device 15 with a guide rail 16 and a carriage 17 supported in it, as well as a drive device, not further shown, that drags the carriage 17 along the guide rail 16 over a distance predetermined by a control unit, not further shown. The carriage 17 carries the roughness sensor 4, which as a result is moved with it. The roughness sensor 4 includes a sensor tip 19, which is supported on an arm 18 and scans the surface of a workpiece 21 and in the process traces the fine structure of the surface that is defined by the surface roughness. The resultant motions of the arm 18 relative to the vertical of the workpiece surface are converted into electrical signals by a converter located in the roughness sensor 4. These signal reach the control unit, not further shown, which displays the signals, stores them in memory, and/or processes them further, for instance in order to ascertain characteristic roughness values. The control unit may as needed also control a vertical adjustment of the guide device 15 and thus of the roughness sensor 4, as indicated by an arrow 22 in FIG. 2.

A pocket 23, in which a testing standard 24 is seated, is embodied on the side of the wall of the recess 9 diametrically opposite the slit 8 and can be seen in FIG. 1 or FIG. 2. The testing standard 24 is for instance a block-shaped body, with a testing face 25 of defined roughness. The testing face 25 points radially inward. It forms a part of the wall of the recess 9. The testing standard 24 is for instance a synthetic resin body, whose testing face 25 forms the molded copy of a face of a calibration or adjustment standard. The pocket 23 is preferably located immediately adjacent to the edge of the recess 9, so that the testing standard 24 is visible from the face end of the receiving device 2 (see FIG. 1). The pocket 23 is so deep that the testing face 25 is somewhat farther outward radially than the wall of the recess 9. When the feeder device 3 is pushed into the region of the pocket 23, a gap 26 remains between the testing face 25 and the outer jacket face of the feeder device 3. This prevents damage to the testing face 25.

The roughness measuring instrument 1 described thus far functions as follows:

To determine the roughness or the characteristic roughness values of a surface of the workpiece 21, the roughness measuring instrument 1 can be set onto the workpiece surface, as FIG. 2 shows. The receiving device 2 then rests with the edges 11, 12 on the workpiece surface. The feeder device 3 can be displaced in the recess 9 in such a way that it either does or does not protrude from it. The roughness sensor 4 is then lowered, out of the position visible in FIG. 2, far enough that the sensor tip 19 is seated on the workpiece surface. If the carriage 17 is now moved along the guide rail 16 by the feeder device at a predetermined speed over a predetermined distance, the sensor tip 19 scans the workpiece surface. The resultant electrical signal can then be recorded, stored in memory, or evaluated, to ascertain characteristic roughness values.

Figure 3:
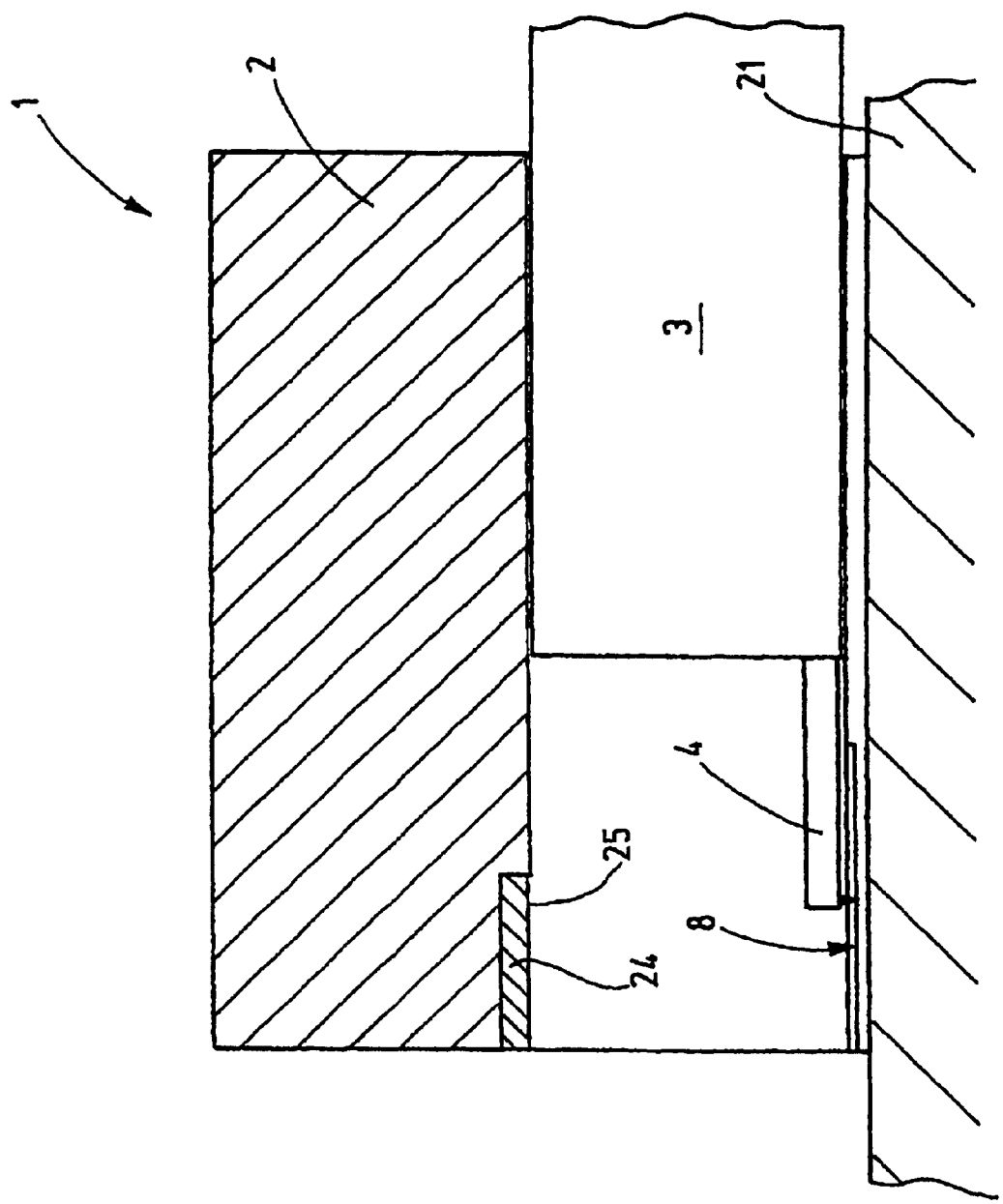
FIG. 3, in longitudinal section, the roughness measuring instrument in a position in which it is out of operation.

A similar procedure with smaller workpieces is possible as shown in FIG. 3. The surface here can be scanned through the slit 8.

Figure 5:
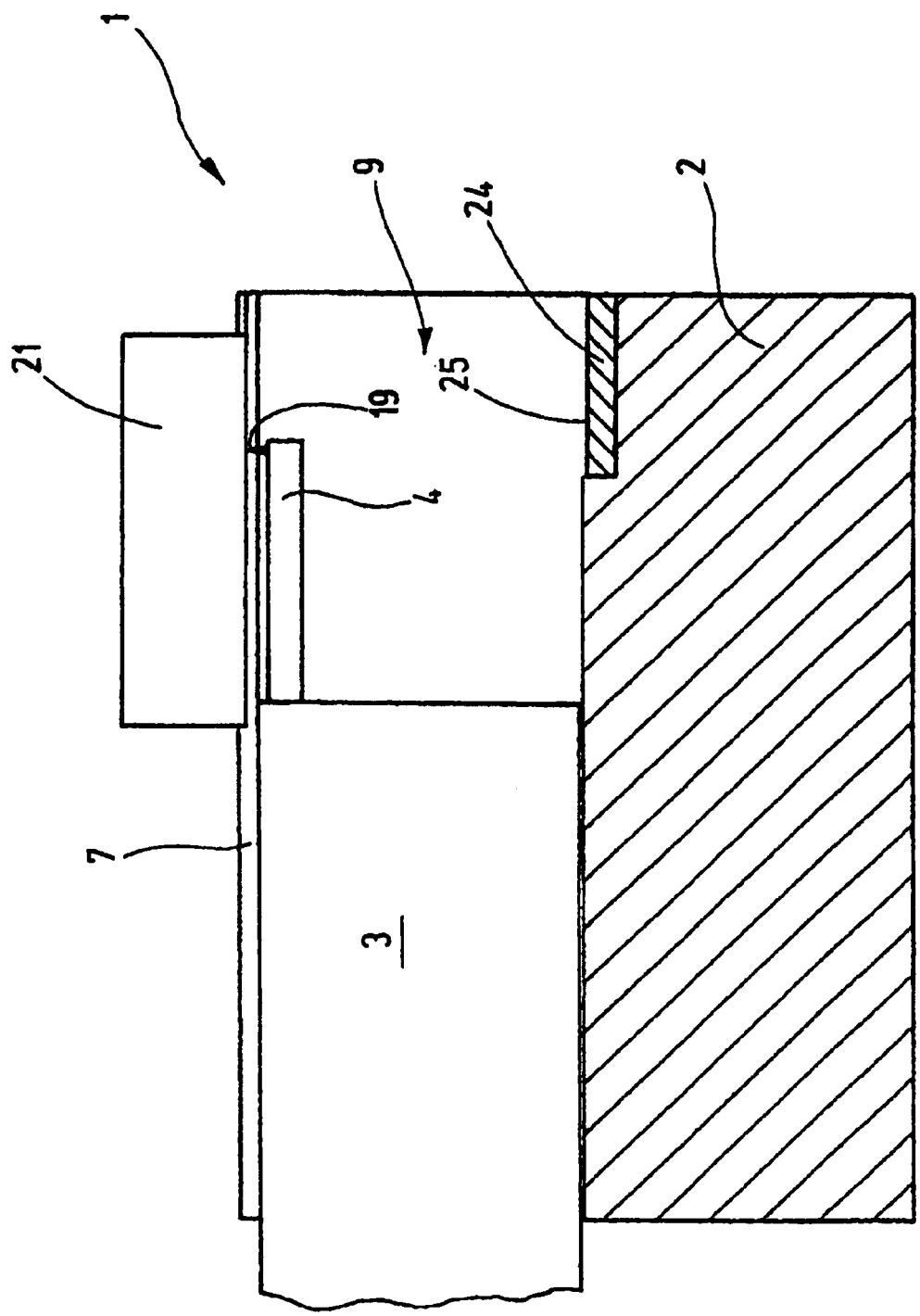
FIG. 5, in longitudinal section, the roughness measuring instrument in measuring a workpiece placed on the roughness measuring instrument.

Another possibility for scanning a workpiece surface is shown in FIG. 5. The receiving device 2 is set up here on its back on a surface beneath it, not further shown. The prism formed by the faces 6, 7 here receives the workpiece 21. The workpiece is for instance a cylindrical object, whose jacket face is to be scanned along a jacket line for determining roughness.

Figure 4:
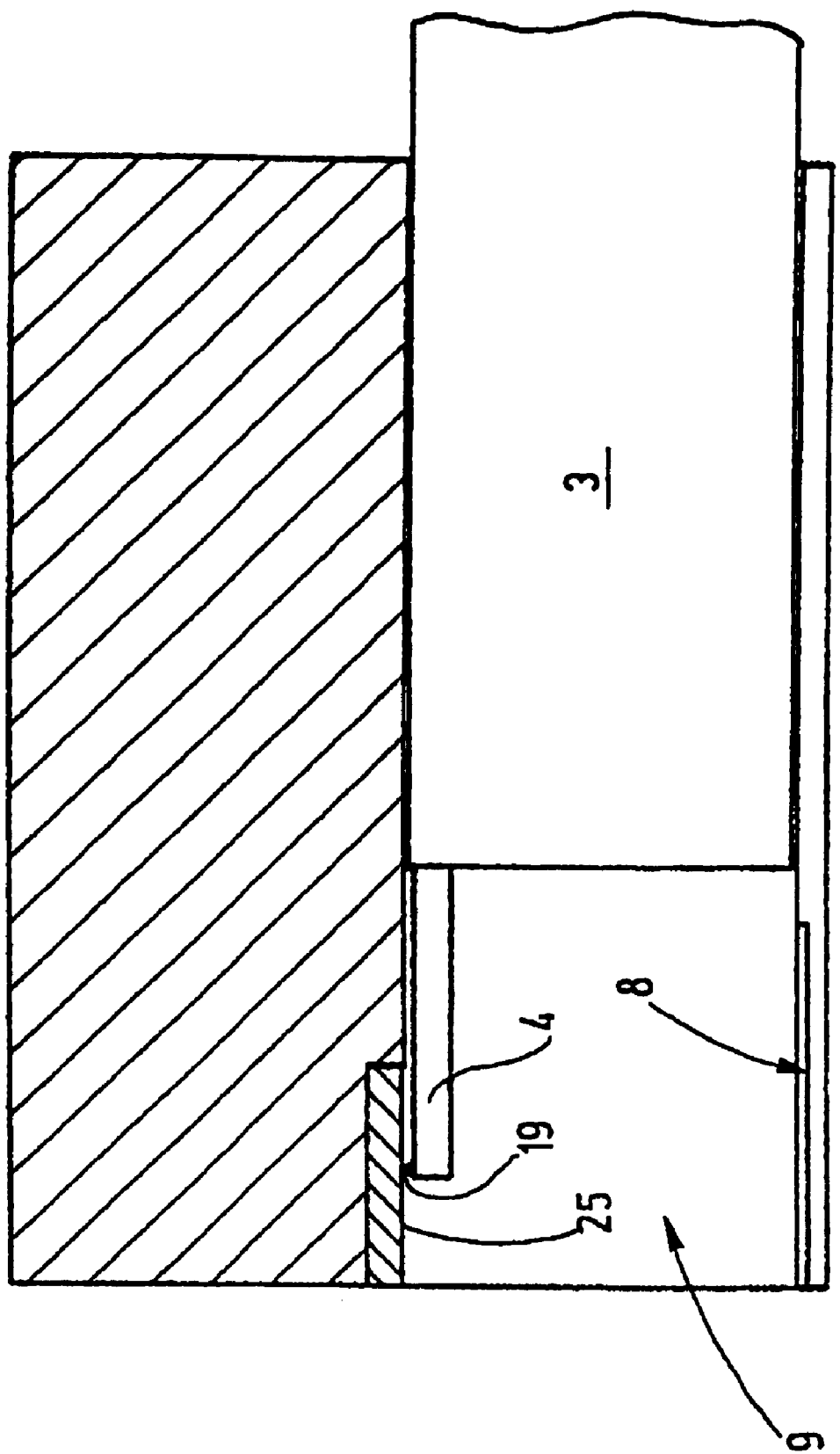
FIG. 4, in longitudinal section, the roughness measuring instrument while checking the calibration.

To check whether the signals furnished by the roughness sensor 4 correctly reflect the vertical parameters of the surface structure of the workpiece 21 in terms of its roughness, a check of the calibration can be made from time to time. To that end, the feeder device 3, as shown in FIGS. 1 and 4, is rotated in the recess 9 in such a way that the roughness sensor 4 is located on the side diametrically opposite the slit 8. In terms of its longitudinal positioning, the feeder device 3 is positioned such that the sensor tip in the vicinity of the edge of the recess 9 is to a certain extent located at the beginning of the testing face 25. The testing face has a length in the longitudinal direction of the recess 9 that corresponds to or exceeds the greatest scanning distance that can be covered. Preferably, the testing face 25 is longer than 20 mm. Its width is preferably a few millimeters, so that when the feeder device is manually rotated, a certain tolerance is possible, and the sensor tip 19 is then securely located on the testing face 25. Otherwise, securing against relative rotation is assured via a pin in the feeder device and the slit 8.

If the sensor tip is located at the beginning of the testing face 25, a test scanning operation is performed. In this mode, the testing face 25 is scanned along a line at a predetermined scanning speed, and the signals furnished by the sensor device are evaluated. If the characteristic roughness values, in particular $R_2$, ascertained in this evaluation are within a predetermined or predeterminable tolerance range around the known roughness parameters of the testing standard 24, then the calibration of the roughness sensor 4 is categorized as correct, and the roughness measuring instrument can continue to be used for regular measurement operation. However, if the characteristic roughness values ascertained in the test scanning operation are outside a tolerance range, or in other words are different by more than a tolerable error from the known characteristic roughness values of the testing standard 24, then the roughness measuring instrument 1 and in particular the roughness sensor 4 must be calibrated. This can be done with a calibration standard. In individual cases, this can also be done with the testing standard 24 if needed. In both cases, scanning is performed at the particular standard used, and depending on the design, a suitable readjustment is made directly at the sensor, at an amplifier device connected to the sensor, or at the evaluation device. For instance, an amplification factor or a damping factor is readjusted.

With the roughness measuring instrument of the invention, it is possible easily and clearly for the user to check the correct calibration of the roughness measuring instrument quickly and simply, in order to assure the validity of his measurements in the production process or in the measurement process.

The roughness measuring instrument 1 has a receiving device 2 for a feeder device 3, which serves to drag a roughness sensor 4 over a workpiece surface. The receiving device 2 carries a testing standard 24 with a testing face 25 within range of the roughness sensor 4. Preferably, the testing standard 24 is located in a pocket affixed to the receiving device 2, and this pocket is embodied in the wall of a bore for receiving the feeder device 3. Its testing face 25 is thus located inside the receiving device 2 in a way that is protected against becoming soiled and damaged yet is readily accessible.

The invention claimed is:

1. A roughness measuring instrument, comprising
   a roughness sensor, which has a sensor tip for scanning a workpiece surface and has a converter, which is connected to the sensor tip and converts the motion thereof into electrical signals;
   a feeder device, which is arranged to move the roughness sensor along a path over a workpiece surface;
   a receiving device, which has a recess for adjustably receiving the feeder device; and
   a testing standard for testing the calibration, which is located on the receiving device, such that the roughness sensor, in one position of the feeder device, is held in a measuring position and in another position of the feeder device, is held in a calibrating position.

2. The roughness measuring instrument in accordance with claim 1, wherein the testing standard is located in the recess.

3. The roughness measuring instrument in accordance with claim 1, wherein the testing standard is formed by a body having a flat testing face, which has a defined roughness.

4. The roughness measuring instrument in accordance with claim 1, wherein the testing standard is a block-shaped body.

5. The roughness measuring instrument in accordance with claim 1, wherein the testing standard is of plastic.

6. The roughness measuring instrument in accordance with claim 1, wherein the testing standard is a molded copy of an adjustment standard.

7. The roughness measuring instrument in accordance with claim 1, wherein the testing standard is located in a pocket which is located in the wall of the recess.

8. The roughness measuring instrument in accordance with claim 7, wherein the testing standard is located in the pocket at such a depth that its testing face is located radially farther outward than the wall.

9. The roughness measuring instrument in accordance with claim 7, wherein the pocket, extending in the longitudinal direction, is located at the orifice of the recess on the face end.

10. The roughness measuring instrument in accordance with claim 1, wherein the feeder device is mounted in the recess of the receiving device for both translational movement relative to the receiving device along the path over a workpiece surface and rotational movement between said measuring position wherein said sensor can engage a workpiece surface and said calibrating position wherein said sensor can engage said testing standard.

11. The roughness measuring instrument in accordance with claim 10, wherein the measuring position and the calibrating position are diametrically opposed from one another.

12. The roughness measuring instrument in accordance with claim 10, wherein the feeder housing and the recess are both cylindrical.

13. The roughness measuring instrument in accordance with claim 10, wherein the testing standard is located in a pocket that is located in a wall of the recess.

14. The roughness measuring instrument in accordance with claim 13, wherein the testing standard is located in the pocket at such a depth that its testing face is located radially farther outward than the wall of the recess.

15. The roughness measuring instrument in accordance with claim 13, wherein the pocket extends in the longitudinal direction of the receiving device from an end face of the receiving device containing an orifice of the recess.

* * * * *